US007926037B2

(12) United States Patent
Leino et al.

(10) Patent No.: US 7,926,037 B2
(45) Date of Patent: Apr. 12, 2011

(54) HIDING IRRELEVANT FACTS IN VERIFICATION CONDITIONS

(75) Inventors: K. Rustan M. Leino, Bellevue, WA (US); Michael Barnett, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1258 days.

(21) Appl. No.: 11/337,129

(22) Filed: Jan. 19, 2006

(65) Prior Publication Data
US 2007/0169019 A1 Jul. 19, 2007

(51) Int. Cl.
G06F 9/45 (2006.01)
(52) U.S. Cl. ........ 717/126; 717/124; 717/131; 717/132; 717/136; 717/137; 717/143; 717/157; 717/159
(58) Field of Classification Search ................ 717/146, 717/126, 137, 152, 153, 158, 131, 160
See application file for complete search history.

(56) References Cited

U.S. PATENT DOCUMENTS

| | | | | |
|---|---|---|---|---|
| 5,963,739 A * | 10/1999 | Homeier | ................ | 717/126 |
| 5,987,252 A * | 11/1999 | Leino et al. | ................ | 717/126 |
| 5,991,540 A * | 11/1999 | Radigan | ................ | 717/158 |
| 6,031,523 A * | 2/2000 | Bunke et al. | ................ | 345/163 |
| 6,035,123 A * | 3/2000 | Razdan et al. | ................ | 717/155 |
| 6,553,362 B2 * | 4/2003 | Saxe et al. | ................ | 706/47 |
| 6,823,507 B1 * | 11/2004 | Srinivasan et al. | ................ | 717/152 |
| 6,839,884 B1 * | 1/2005 | Narain et al. | ................ | 716/5 |
| 6,907,599 B1 * | 6/2005 | Kashai et al. | ................ | 717/137 |
| 7,007,272 B2 * | 2/2006 | Clarke | ................ | 717/153 |
| 7,024,661 B2 * | 4/2006 | Leino et al. | ................ | 717/126 |
| 7,058,925 B2 * | 6/2006 | Ball et al. | ................ | 717/106 |
| 7,080,365 B2 * | 7/2006 | Broughton et al. | ................ | 717/146 |
| 7,100,164 B1 * | 8/2006 | Edwards | ................ | 718/108 |
| 7,171,655 B2 * | 1/2007 | Gordon et al. | ................ | 717/146 |
| 7,246,056 B1 * | 7/2007 | Brewton | ................ | 703/20 |
| 2002/0083418 A1 * | 6/2002 | Saxe et al. | ................ | 717/126 |
| 2002/0112201 A1 * | 8/2002 | Flanagan et al. | ................ | 714/42 |
| 2003/0154468 A1 * | 8/2003 | Gordon et al. | ................ | 717/143 |
| 2004/0003380 A1 * | 1/2004 | Fedorov | ................ | 717/148 |
| 2005/0108695 A1 * | 5/2005 | Li et al. | ................ | 717/144 |
| 2007/0169019 A1 * | 7/2007 | Leino et al. | ................ | 717/136 |
| 2008/0270988 A1 * | 10/2008 | Li et al. | ................ | 717/125 |

OTHER PUBLICATIONS

The Spec# Programming System: An Overview Author: Mike Barnett, K. Rustan M.Leino, Wolfarm Schulte Manuscript KRML136, Oct. 12, 2004. To Appear in CLASSIS 2004 Preceeding.*
Weakest Precondition of Unstructured Program Author: Mike Barnett, K Rustan M. Leino. Microsoft Published Paper.*
Author: Erine Cohen, Michal Moskal, Wolfram Schulte, Stephan Tobies Title:A Practical Verification Methodology for Concurrent Programs Date: Jan. 12, 2008 pp. 10.*

(Continued)

*Primary Examiner* — Michael J Yigdall
*Assistant Examiner* — Ziaul Chowdhury
(74) *Attorney, Agent, or Firm* — Merchant & Gould

(57) ABSTRACT

A program verification process begins by converting a language of the program from a first language into an intermediate language representation. The loops of the program are eliminated. The program is converted from the intermediate language representation into a passive form. Dominators for the passive form of the program are determined. A verification condition is generated from the passive form of the program. The verification condition is structured according to the computed dominators such that when a theorem prover identifies a potential error, portions of the passive form of the program irrelevant to the potential error are ignored.

13 Claims, 7 Drawing Sheets

OTHER PUBLICATIONS

Author:Sorin Lerner, Todd Millstein, Craig Chambers Title: Automatically Proving the Correctness of Compiler Optimizations Date: May 3, 2006 pp. 12.*

Author:Sascha Böhme, K. Rustan M. Leino and Burkhart Wolff Title:HOL-Boogie—An Interactive Prover for the Boogie Program-Verifier Date:TPHOLs2008 pp. 16.*

Author: K. Rustan M. Leino, and Francesco Logozzo Title:Loop invariants on demand Date:APALS 2005 pp. 16.*

Author: K. Rustan M. Leino, and Peter M''uller Title:Modular verification of static class invariants Date:FM 2005 pp. 16.

Author: K. Rustan M. Leino, Rosemary Monahan Title:Reasoning about Comprehensions with FirstOrder SMT Solvers Date: Mar. 8-12, 2009 pp. 8.

Author: Mike Barnett, K. Rustan M. Leino, and Wolfram Schulte Title:The Spec# Programming System: An Overview Date: Oct. 12, 2004 pp. 21.

Author: Mike Barnett and K. Rustan M. Leino Title:Weakest-Precondition of Unstructured Programs Date: 2005 pp. 8.

Rustan, K., et al.; "*A SAT Characterization of Boolean-Program Correctness*"; Microsoft Research; Appears in the SPIN 2003 workshop proceedings; Springer LNCS.

* cited by examiner

Control-Flow Graph

Exemplary Dominator Tree

HIDING IRRELEVANT FACTS IN VERIFICATION CONDITIONS

BACKGROUND

Program verification systems are tasked with proving that a program performs the actions and objectives the program was written to realize. The definition of what the program is expected to do is often referred to as the program's specification. Most program verification systems transform a program into one or more logical expressions that are then tested for validity against the specification. The logical expression represents the weakest precondition of the program relative to the specification of the program. When the expression is proved, then the program is considered correct.

Automated theorem proving or automatic program verification refers to the proving or refuting of mathematical conjectures by a computer program. Depending on the underlying logic, the problem of deciding the validity of a conjecture varies from trivial to impossible. For automatic program verification, parts of the computer program are translated into verification conditions. Each one of these verification conditions is valid if and only if the program is correct with respect to the properties that being verified. These verification conditions may be passed to a theorem prover that attempts to determine whether or not the verification condition is valid.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the subject matter disclosed herein are related to structuring verification conditions in a unique way so that irrelevant facts are hidden from a theorem prover. Hiding these facts results in these facts not being accessed by the theorem prover unless the final outcome (e.g., valid, not valid) depends on those facts.

A verification condition is generated from a general control-flow graph that represents the logical flow of operation blocks of a program. The control-flow graph is then transformed into an unstructured, acyclic, passive representation of the program. The unstructured, acyclic, passive representation is used to generate the verification condition using the dominator information to hide irrelevant facts from the theorem prover. Accordingly, when an error is encountered in an operational block of code of the program, other blocks not relevant to the error may be skipped by a theorem prover in the verification process.

These and other features and advantages, which characterize the various aspects of the disclosed subject matter, will be apparent from a reading of the following detailed description and a review of the associated drawings. It is to be understood that both the foregoing general description and the following detailed description are exemplary and explanatory only and are not restrictive of the invention as claimed.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
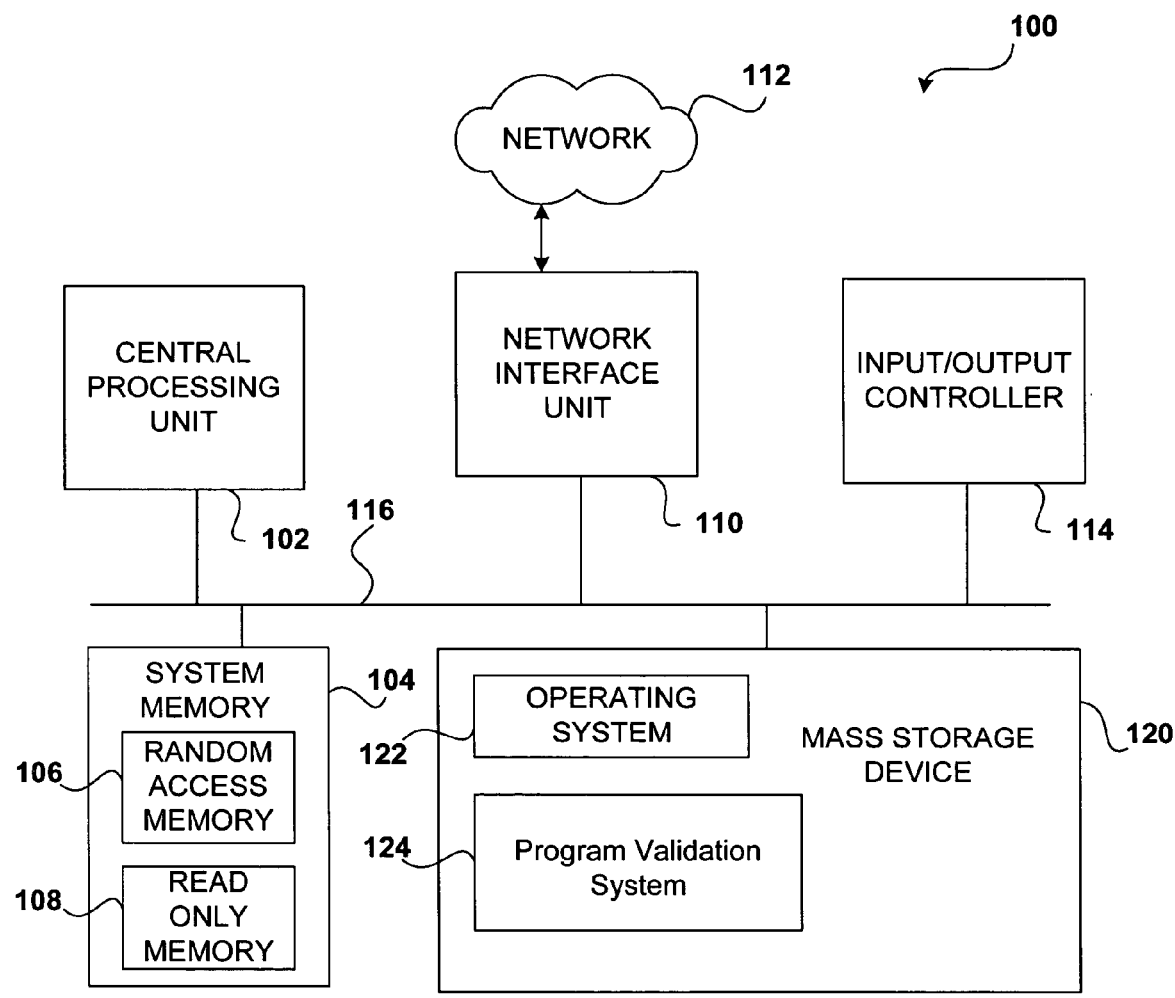
FIG. 1 illustrates an exemplary computing architecture for a computer.

Embodiments are herein described more fully below with reference to the accompanying drawings, which form a part hereof, and which show specific examples for practicing the embodiments. However, embodiments may be implemented in many different forms and should not be construed as limited to the embodiments set forth herein; rather, these embodiments are provided so that this disclosure will be thorough and complete, and will fully convey the scope of the subject matter to those skilled in the art. Embodiments disclosed may be practiced as methods, systems or devices. Accordingly, embodiments disclosed may take the form of an entirely hardware implementation, an entirely software implementation or an implementation combining software and hardware aspects. The following detailed description is, therefore, not to be taken in a limiting sense.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments of the described herein are referred to variously as operations, structural devices, acts or modules. These operations, structural devices, acts and modules may be implemented in software, in firmware, in special purpose digital logic, and any combination thereof.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an exemplary computer architecture for a computing device 100 utilized in various embodiments will be described. The computer architecture shown in FIG. 1 may be configured in many different ways. For example, the computer may be configured as a personal computer, a mobile computer and the like. As shown, computing device 100 includes a central processing unit 102 ("CPU"), a system memory 104, including a random access memory 106 ("RAM") and a read-only memory ("ROM") 108, and a system bus 116 that couples the memory to the CPU 102. A basic input/output system containing the basic routines that help to transfer information between elements within the computer, such as during startup, is stored in the ROM 108. The computing device 100 further includes a mass storage device 120 for storing an operating system 122, application programs, and other program modules, which will be described in greater detail below.

The mass storage device 120 is connected to the CPU 102 through a mass storage controller (not shown) connected to the bus 116. The mass storage device 120 and its associated computer-readable media provide non-volatile storage for the computing device 100. Although the description of computer-readable media contained herein refers to a mass storage device, such as a hard disk or CD-ROM drive, the computer-readable media can be any available media that can be accessed by the computing device 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computing device 100.

Although not used in embodiments described herein, the computing device 100 operates in a networked environment using logical connections to remote computers through a network 112, such as the Internet. The computing device 100 may connect to the network 112 through a network interface unit 110 connected to the bus 116. The network interface unit 110 may also be utilized to connect to other types of networks and remote computer systems.

The computing device 100 may also include an input/output controller 114 for receiving and processing input from a number of devices, such as: a keyboard, mouse, electronic stylus and the like. Similarly, the input/output controller 114 may provide output to a display screen, a printer, or some other type of device (not shown).

As mentioned briefly above, a number of program modules and data files may be stored in the mass storage device 120 and RAM 106 of the computing device 100, including an operating system 122 suitable for controlling the operation of a networked computer, such as: the WINDOWS XP® operating system from MICROSOFT® CORPORATION; UNIX®; LINUX® and the like. The mass storage device 120 and RAM 106 may also store one or more program modules. In particular, the mass storage device 120 and the RAM 106 may store a program validation system 124.

As described herein, program validation system 124 includes functionality for verifying the correctness of a program while hiding irrelevant facts from a theorem prover. The program validation system 124 generates a verification condition from the program and its specification. The verification condition can then be supplied to the theorem prover to validate the program.

The present disclosure provides embodiments for engineering the verification condition to improve speed of performance for validating a program. One aspect of the embodiments described prevents redundancy in the verification condition, which lets the theorem prover complete its task more efficiently. Although the exact nature of what constitutes redundancy may depend on the operation of the theorem prover, one general goal is that the formula not be dramatically larger than needed. The verification condition engineered by the program validation system 124 is arranged so that irrelevant facts to an error are hidden from the theorem prover.

As described more fully below, the program validation system 124 starts with a general control-flow graph. The control-flow graph is then transformed into a reducible one that corresponds to an intermediate language. The programming loops are eliminated to produce an acyclic control-flow graph that is correct only if the original program is correct. A single-assignment transformation is applied to the acyclic program and the program is turned into a passive program by changing assignment statements into assume statements. Dominators are determined for each of the program blocks within the control-flow graph. Finally, weakest preconditions logic is applied to the unstructured, acyclic, passive program to generate the verification condition using the dominator information to hide irrelevant facts from the theorem prover.

Throughout the specification and claims, the following terms take the meanings explicitly associated herein, unless the context clearly dictates otherwise.

"Potential error" generally refers to a possible error that may occur in a block of a program that causes the program to be invalid when tested. Any condition that results in a determination that the program is invalid may be related to a potential error. The potential error indicates that when the program is executed, an error may occur in that block of the program.

"Program" is generally defined as a collection or chunk of code or logical statements that perform a function when executed on a computing device. A program may be written in any programming language and may include any number of basic blocks that, when added together, form the program. In one embodiment, the program referred to herein is an unstructured program.

"Specification" is generally defined as the definition of what a computer program is expected to do. It can be "informal", in which case it can be considered as a blueprint or user manual from a developer point of view, or "formal", in which case it has a definite meaning defined in mathematical or programmatic terms. A formal specification is a mathematical description of the program that may be used to develop an implementation. It describes what the system should do, not (necessarily) how the system should do it. Given such a specification, it is possible to use verification techniques to demonstrate that a candidate system design is correct with respect to the specification. This has the advantage that incorrect candidate system designs can be revised before a major investment has been made in actually implementing the design.

"Unstructured programming" generally refers to a programming paradigm where all code is contained in blocks, but the structure between the blocks arbitrary. This is contrary to structured programming, where programmatic tasks are split into smaller sections (known as functions or subroutines) that can be called whenever they are required. Unstructured programming languages rely on execution flow statements such as "Goto", used in many languages to jump to a specified section of code. Translation from a structured program to an unstructured program presents far less difficulty than attempting to translate from an unstructured program to a structured program. Unstructured source code may be difficult to read and debug, but can offer a significant improvement in processing speed.

"Verification Condition" corresponds to a logical formula whose validity reflects the correctness of the program currently under analysis. The validity of the verification condition implies that the program meets the specification.

Figure 2:
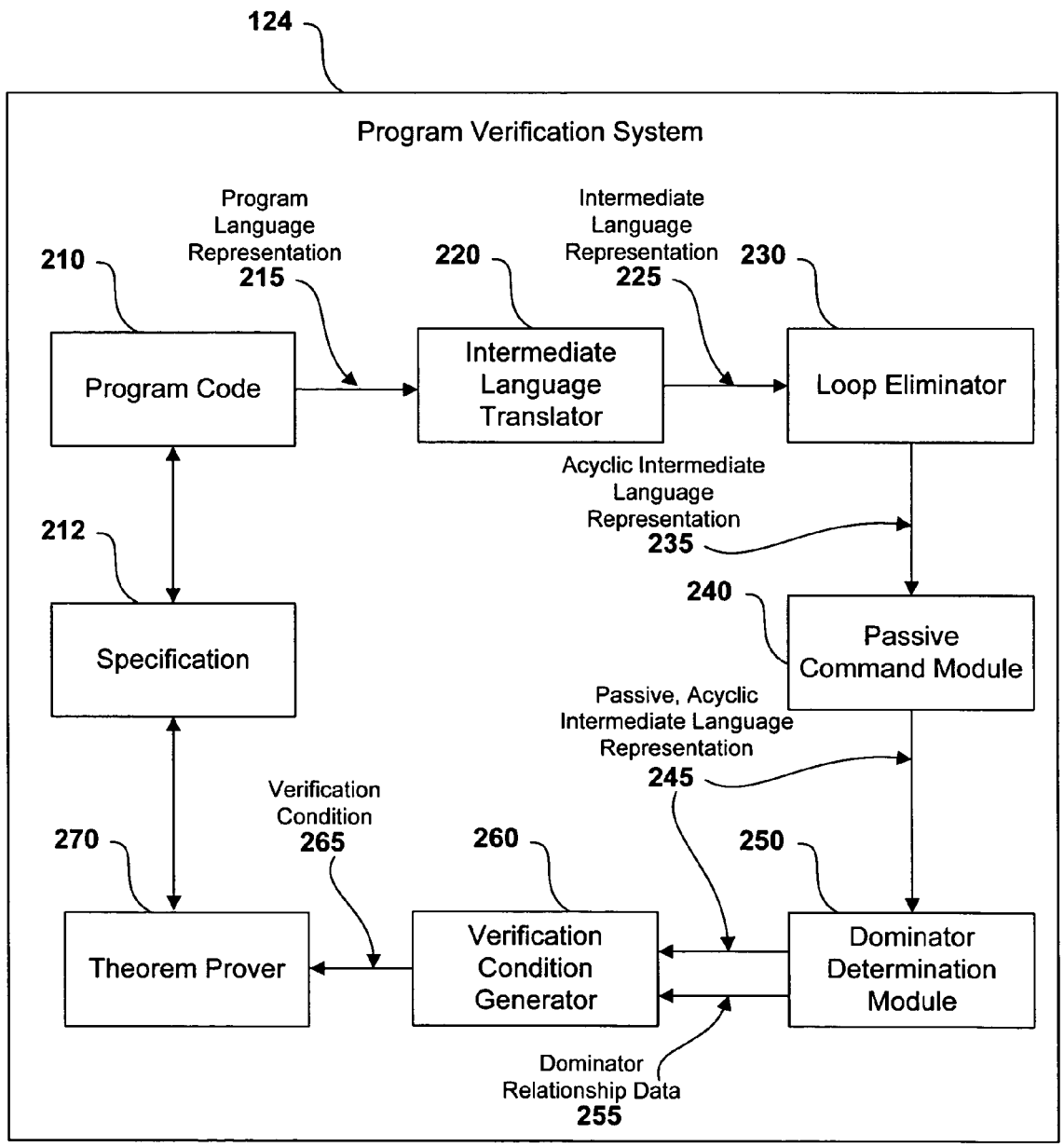
FIG. 2 illustrates a functional block diagram of an exemplary system for a validating a verification condition representing a program.

FIG. 2 illustrates a functional block diagram of an exemplary system for a validating a verification condition representing a program, in accordance with the present disclosure. Program verification system 124 includes program code 210, specification 212, intermediate language translator 220, loop eliminator 230, passive command module 240, dominator determination module 250, verification condition generator 260, and theorem prover 270.

In operation, program code 210 is provided according to a programming language representation 215 to intermediate language translator 220 to translate the code into an intermediate language representation 225 that is capable of generally describing an unstructured program. In one embodiment, the intermediate language of the program is represented by a control-flow graph of the program (see FIGS. 4A and 4B). The intermediate language representation 225 of intermediate language translator 220 is provided to loop eliminator 230. Loop eliminator 230 removes the loops from the code, resulting in an acyclic intermediate language representation 235 of the program. The acyclic intermediate language representation 225 generated by loop eliminator 230 is provided to passive command module 240 which converts the intermediate language, acyclic representation 235 of the program into a passive, acyclic intermediate language representation 245 of the program. In one embodiment, the representation of the program becomes a passive representation of the program by replacing any "assignment" statements of the program with "assume" statements.

Dominator determination module 250 determines the dominators (represented by dominator relationship data 255) of the passive, acyclic intermediate language representation 245 of the program. Verification condition generator 260 uses the dominator relationship data 255 to generate the verification condition 265 such that when the verification condition is passed to theorem prover 270, irrelevant portions of the program a hidden from theorem prover 270 when processed. The theorem prover validates the passive, acyclic intermediate language representation 245 of the program against the program's specification 212, but ignores untested portions that are irrelevant to discovered potential errors. The process steps for generating the verification condition 265 according to program verification system 124 are further described in the discussion of FIG. 3 below.

Figure 3:
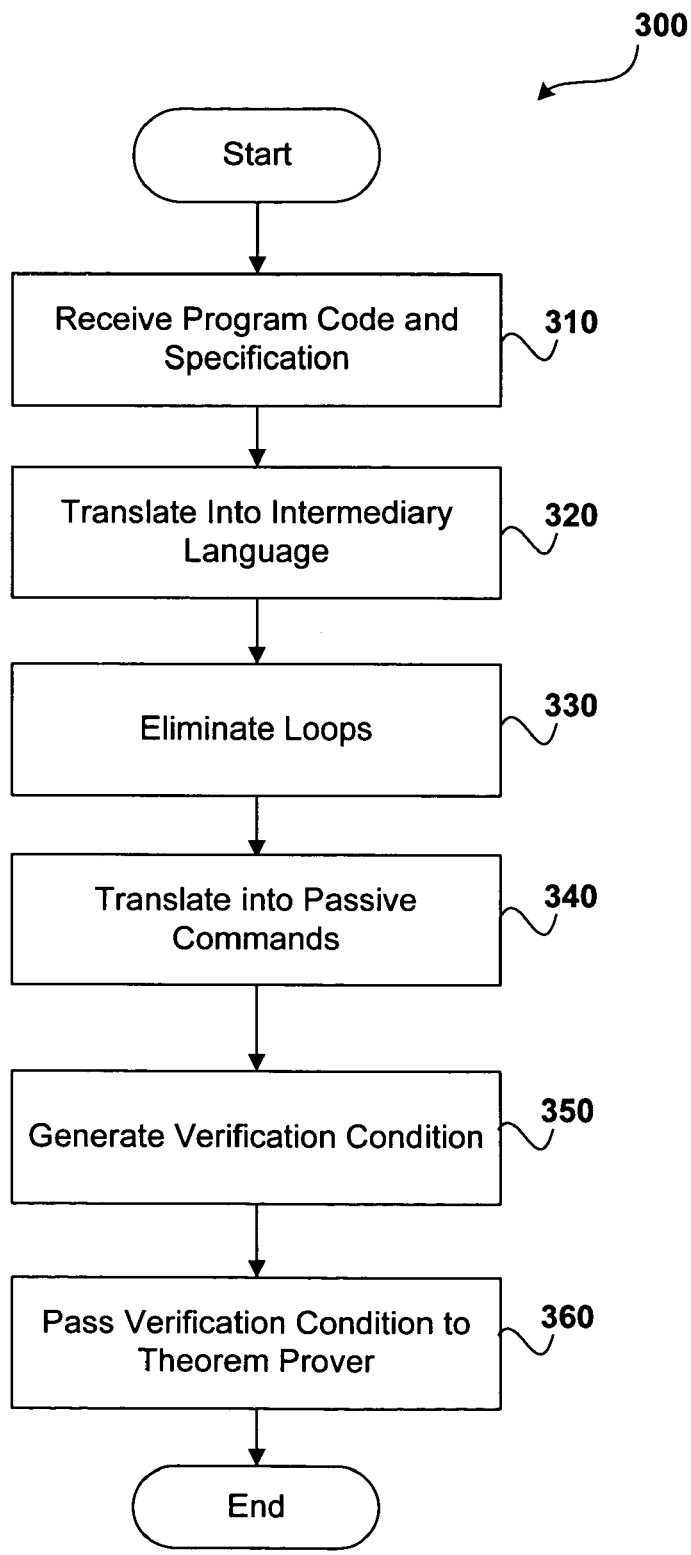
FIG. 3 illustrates an operational flow diagram of an exemplary process for generating a verification condition.

FIG. 3 illustrates an operational flow diagram of an exemplary process for generating a verification condition, in accordance with the present disclosure. Process 300 starts where a program and specification have been selected for a determination of the correctness of the program. Processing continues with operation 310.

At operation 310, the code of the program and its specification are received by the program validation system for determining whether the program is valid against its specification. The code may be in any programming language. The code may represent a structured or unstructured program. Once the code and specification are received, processing continues with operation 320.

At operation 320, the program code is translated into an intermediate language that can be processed by the program validation system. In one embodiment, the intermediary language corresponds to a language that may be represented by a reducible control-flow graph. A reducible control-flow graph is one where it is possible to identify a unique loop head for each loop in the program flow. An exemplary control-flow graph with loops is provided in FIG. 4A. Once the program code has been translated to the intermediary language, processing continues to operation 330.

At operation 330, the loops in the in the intermediary language representation of the program are eliminated. In one embodiment, eliminating the loops converts the reducible control-flow graph to an acyclic control-flow graph. The control-flow graph shown in FIG. 4B is a representation of an acyclic control-flow graph.

In one embodiment, to eliminate the loops, the loops are first identified. The loops are identified by locating each of the "back edges" (e.g., 404 of FIG. 4A) in the reducible control-flow graph. A back edge is an edge in the control-flow graph whose tail (target of the edge) dominates its head (source of the edge). One node dominates another node when all paths in the latter pass through the former. The "loop header" (e.g., 402 of FIG. 4A) for a back edge, B, is the target of the edge. A loop header, L, may have more than one loop associated with it: each natural loop (e.g., 410 of FIG. 4A) is identified by the pair (L, B). The back edges are removed to cut the loops, thus transforming the control-flow graph into an acyclic graph. However, in order for the loop body to represent an arbitrary loop iteration, the variables modified within the loop are assigned symbolic values that represent the variable's values in an iteration of the loop.

For each natural loop (L, B), the variables that are updated by any statement in any block in the loop are collected in to a set H (L, B). These variables are referred to as "loop targets". For each loop target v in H (L, B), a havoc statement is introduced and inserted at the beginning of L, before any of the existing statements in that block. A havoc statement assigns an arbitrary value to a variable. Introducing havoc statements for the variables in a loop causes the theorem prover to consider an arbitrary loop iteration. Wiping out all knowledge of the value a variable might hold may cause the theorem prover to be unable to prove the verification condition. That is, it induces an over-approximation of the original program and loses precision. To this end, in order to recover any needed precision, each loop is allowed to have an "invariant": a condition that must be met for each iteration of the loop. Loop invariants are encoded as a prefix of assert statements at the beginning of the loop header's code block. These assert statements are not validated at this time if any of the variables mentioned by the assert statements are in H (L, B). Instead, a copy of this sequence of statements is introduced into each predecessor node of L(including the node that is the source of the back edge). Since the assertions are now checked just before the jump to the loop header, the statements are changed into assume statements in L itself. The loop invariants are processed in this way before adding the havoc statements and cutting the back edges. The resulting havoc statements followed by the assume statements have the effect of retaining, about the loop targets, the information in the loop invariant.

An example of the loop elimination process is given as follows:

Consider the following source program:

---
PROGRAM 1-A
---
```
int M (int x)
    requires 100 <= x; // precondition
    ensures result == 0; // postcondition
{
    while (0 < x)
        invariant 0 <= x; // loop invariant
    {
        x = x - 1;
    }
}
```
---

The control-flow graph corresponding to this method is encoded as follows, where variable r denotes the result value:

---
PROGRAM 1-B
---
| | |
|---|---|
| Start: | assume $100 \leq x$ ; // precondition |
| | goto LoopHead ; |
| LoopHead: | assert $0 \leq x$ ; // loop invariant |
| | goto Body, After ; |
| Body: | assume $0 < x$ ; // loop guard |
| | x := x − 1 ; |
| | goto LoopHead ; |
| After: | assume $\neg(0 < x)$ ; // negation of guard |
| | r := x ; // return statement |
| | assert r = 0 ; // postcondition |
| | goto ; |
---

After cutting back edges the control-flow graph is encoded as follows:

---
PROGRAM 1-C
---
| | |
|---|---|
| Start: | assume $100 \leq x$ ; |
| | assert $0 \leq x$ ; // check inv. |
| | goto LoopHead ; |
| LoopHead: | havoc x ; // havoc loop targets |
| | assume $0 \leq x$ ; // assume inv. |
| | goto Body, After ; |
| Body: | assume $0 < x$ ; // loop guard |
| | x := x − 1 ; |
| | assert $0 \leq x$ ; // check inv. |
| | goto ; //removed back edge |
| After: | assume $\neg(0 < x)$ ; |
| | r := x ; |
| | assert r = 0 ; |
| | goto ; |
---

The method described in the preceding paragraphs is one method where the loops of the reducible control-flow graph are eliminated to produce an acyclic control-flow graph. Once the acyclic control-flow graph is generated, processing moves to operation 340.

At operation 340, the representation of the code corresponding to the acyclic control-flow graph is converted to passive commands. In one embodiment, the loop-free program is converted into a passive program by rewriting the program in a single-assignment form and then removing all of the assignment statements. Dynamic single-assignment (DSA) is similar to the static single-assignment (SSA) where even statically in the program text there is at most one definition for each variable. In DSA form, there may be more than one definition, but in any program execution, at most one of the definitions is executed. The loop-free program is converted into DSA form by noting that after each update to a variable, its value must be understood relative to the newly updated state by identifying each updated value as a new incarnation of the variable. For instance, the assignment statement x:=x+1 is replaced with the assignment statement $x_{i+k}$:=$x_i$+1, where $x_{i+k}$ is a fresh incarnation. In general, the variables read by the statement are replaced by their current incarnations. After a variable update (assignment or havoc statement), a fresh incarnation becomes the new current incarnation for the updated variable. At the beginning of the program, an initial incarnation is created for each program variable. The last incarnation of a variable in a block of the control-flow graph is referred to as the block's incarnation for that variable. The algorithm for performing these replacements processes the graph in a topologically sorted order.

Using the example above, the passive form of PROGRAM 1-C corresponds to the following:

---
PROGRAM 1-D
---
| | |
|---|---|
| Start: | assume $100 \leq x_0$ ; |
| | assert $0 \leq x_0$ ; |
| | goto LoopHead ; |
| LoopHead: | skip ; |
| | assume $0 \leq x_1$ ; |
| | goto Body, After ; |
| Body: | assume $0 < x_1$ ; |
| | assume $x_2 = x_1 − 1$ ; |
| | assert $0 \leq x_2$ ; |
| | goto ; |
| After: | assume $\neg(0 < x_1)$ ; |
| | assume $r_1 = x_1$ ; |
| | assert $r_1 = 0$ ; |
| | goto ; |
---

Once the representation of the program is converted from an acyclic, intermediate language to a passive, acyclic intermediate language, processing continues with operation 350.

At operation 350, the verification condition is generated from the passive, acyclic intermediate language representation of the program. In one embodiment, an initial form of the verification condition is generated by determining the weakest preconditions of the passive, acyclic intermediate language representation of the program. In this embodiment, the verification condition that results from determining the weakest preconditions is linear in size when compared to the program. To determine the weakest precondition, for any statement S and predicate Q on the post-state of S, the weakest precondition of S with respect to Q, written wp(S, Q), is a predicate that characterizes the pre-states of S from which no execution includes an error and from which every terminating execution ends in a state satisfying Q. The weakest preconditions of the passive statements are defined as follows, for any Q:

$$wp(\text{assert } P, Q) = P \wedge Q \qquad (1)$$

$$wp(\text{assume } P, Q) = P => Q \qquad (2)$$

$$wp(S; T, Q) = wp(S, wp(T, Q)) \qquad (3)$$

In a structured program, a problem arises when determining the weakest preconditions when encountering the choice statement, S ⊓ T, which arbitrarily chooses one of S and T to execute. Its weakest precondition is defined by:

$$wp(S \sqcap T, Q) = wp(S, Q) \wedge wp(T, Q) \qquad (4)$$

The problem is that the duplication of Q in the right-hand side of this equation introduces redundancy. Q represents proof obligations downstream of the choice statement, and the formulation of equation 4 suggests that the theorem prover would need to process Q twice. In general, Q may need to be processed twice, but in practice, large parts of Q are often independent of which choice is taken. Passive programs satisfy a property that lets this wp equation be formulated in a way that significantly reduces redundancy. The alternate form uses wp and so-called "weakest liberal preconditions (wlp)" and produces verification conditions whose size is quadratic in the size of the passive program. This alternate form applies to structured programs only, so applying it to unstructured programs would require some preprocessing step. Unstructured programs do not have the structured choice statement. Instead, they have goto statements. For every block in control-flow graph (e.g., A: S; goto. . .) an auxiliary variable (e.g., $A_{ok}$) is introduced. $A_{ok}$ is true if the program is in a state from which all executions beginning from block A are correct. The following block equation may be postulated:

$$A_{ok} \equiv wp\left(S, \bigwedge_{B \in Succ(A)} B_{ok}\right) \quad (5)$$

where Succ(A) denotes the set of successors of A so that the second argument to wp is the conjunction of $B_{ok}$ for each block B in that set. The verification condition and block equations are in terms of the program's variables and the auxiliary variables.

For the previous example, the weakest precondition determination for the passive, acyclic intermediate language representation of the program (PROGRAM 1-D) results in the following verification condition comprised of the shown set of block equations:

| PROGRAM 1-E |
|---|
| ($Start_{ok}$ $\equiv 100 \leq x_0 \neg 0 \leq x_0$ $\hat{}$ $LoopHead_{ok})$ $\hat{}$ |
| ($LoopHead_{ok}$ $\equiv 0 \leq x_1 \neg Body_{ok}$ $After_{ok})$ $\hat{}$ |
| ($Body_{ok}$ $\equiv 0 < x_1 \neg x_2 = x_1 - 1 \Rightarrow 0 \leq x_2$ $\hat{}$ true) $\hat{}$ |
| ($After_{ok}$ $\equiv \Rightarrow (0 < x_1) \Rightarrow r_1 = x_1 \neg r_1 = 0$ true) |
| $\neg Start_{ok}$ |

Figure 4B:
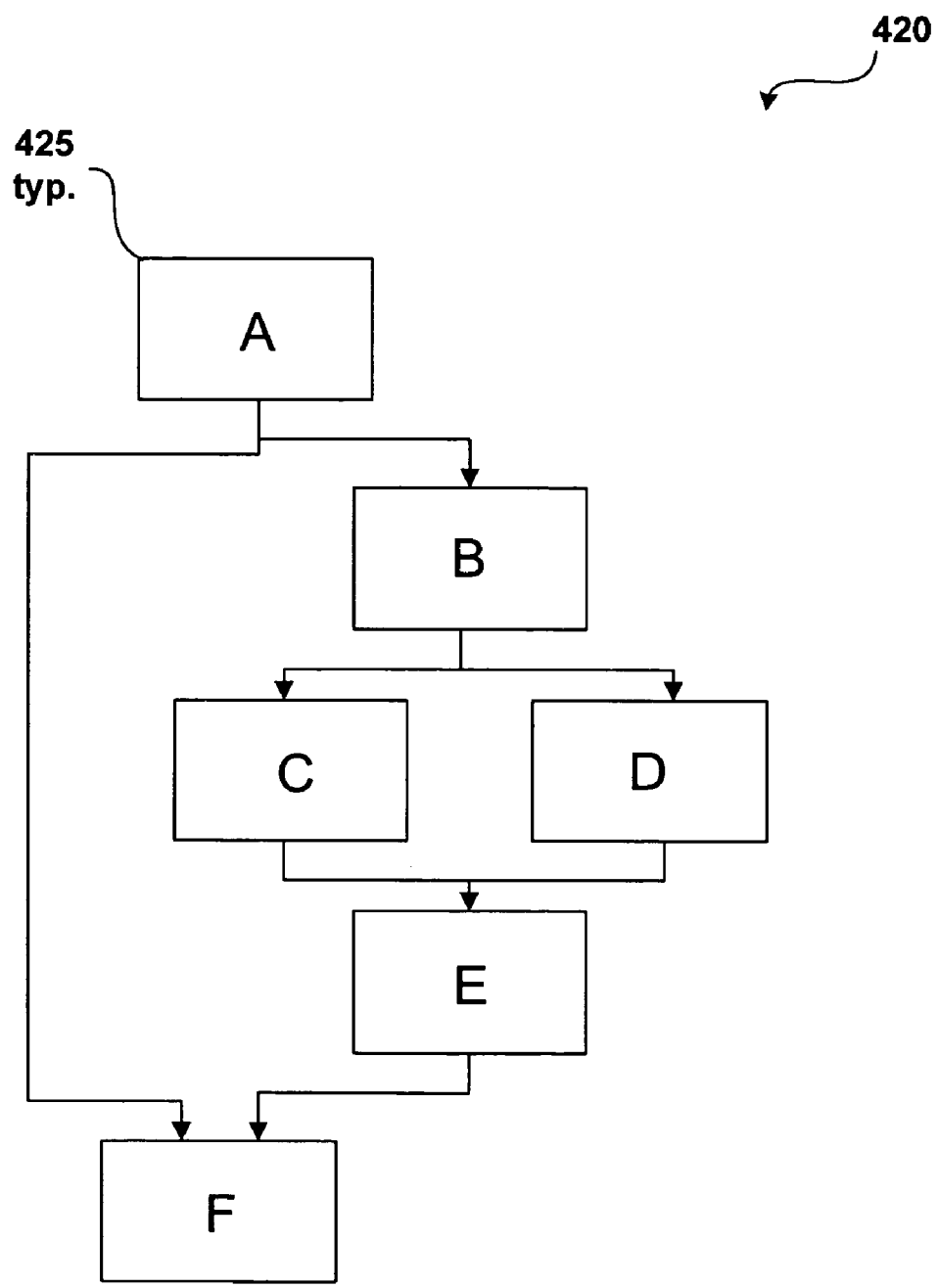
FIG. 4B illustrates an exemplary control-flow graph for a typical program used in generating the verification condition.
Figure 5:
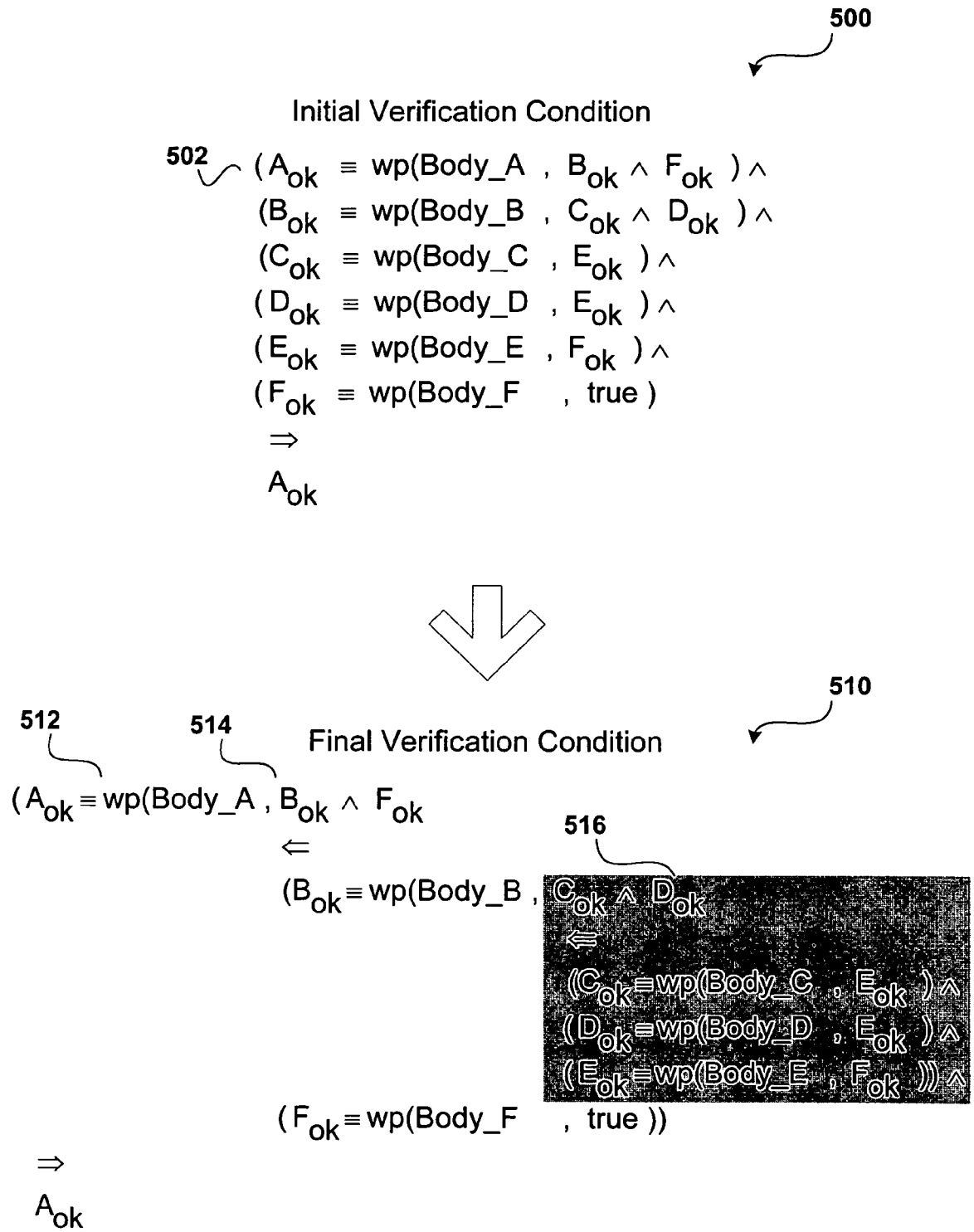
FIG. 5 illustrates exemplary block equations used to provide a verification condition and the arrangement of the verification condition to hide irrelevant facts.
Figure 6:
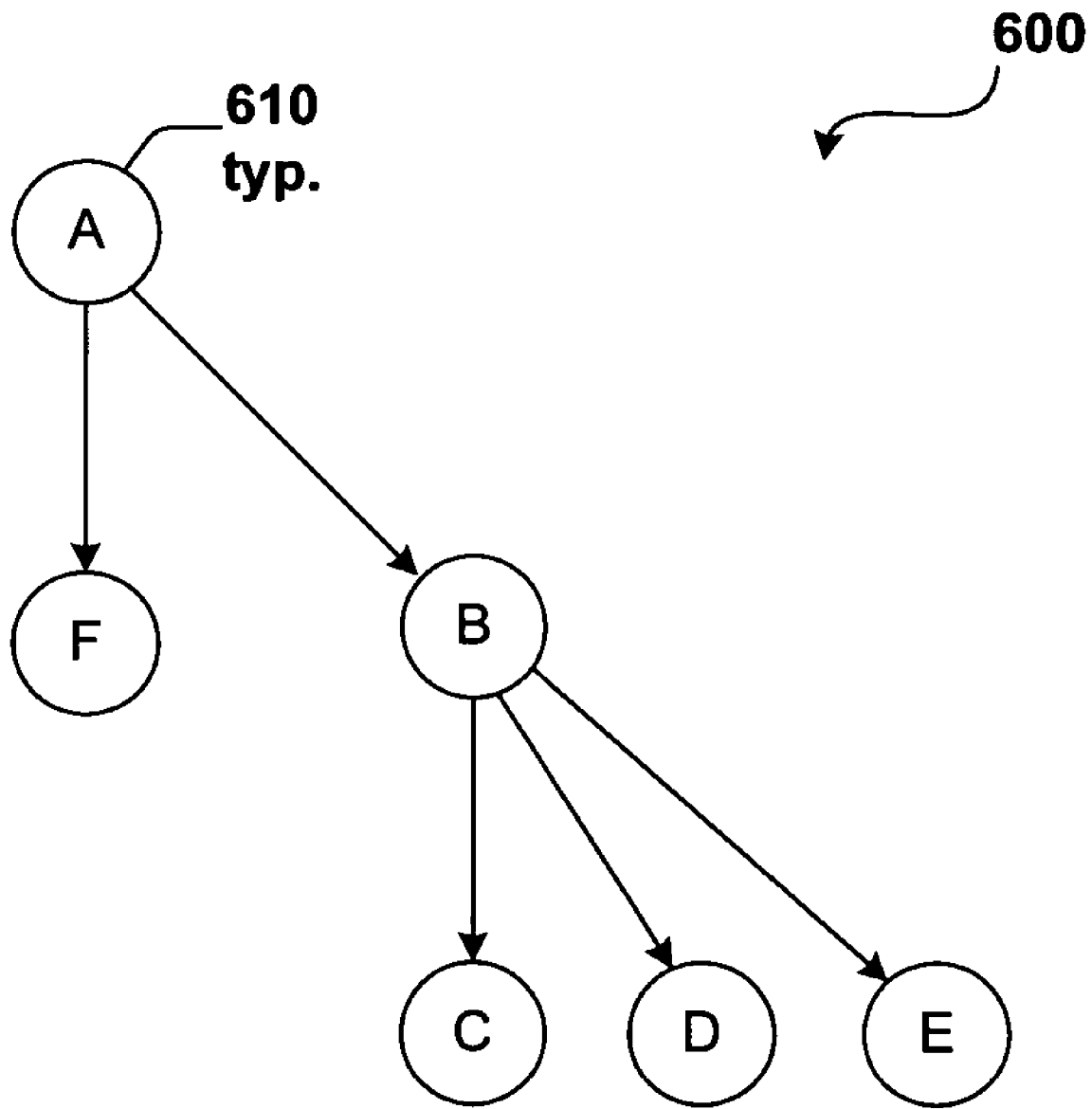
FIG. 6 illustrates an exemplary dominator tree corresponding to the control-flow graph of FIG. 4B, in accordance with aspects of the present invention.

The right-associative operator $\Rightarrow$ has a binding power that lies between that of $\equiv$ and $\wedge$. As described herein, PROGRAM 1-E represents an initial form of the verification condition. The final form of the verification condition corresponds to a rearrangement of the block equations so that irrelevant facts are hidden from the theorem prover. FIGS. 4B, 5, and 6 described below illustrate an example of the generation of the final form of verification condition that hides portions of the verification condition from the theorem prover such that the theorem prover is more likely to consult those areas of the verification condition only when the final outcome (e.g., valid, not valid) depends on those areas. Once the final form of the verification condition is generated, processing continues to operation 360.

At operation 360, the verification condition, in its final form, is passed to the theorem prover for determining the correctness of the program. As shown in FIG. 5, portions of the program (e.g., 514, 516) are nested according to dominator information. The nested areas of the program need not be reached by the theorem prover unless other initially tested areas of the program (e.g., 512) are found to be valid. After the verification condition is forwarded to the theorem prover, process 300 ends and control moves onto verifying the program or other tasks.

The operations of FIG. 3 may perform in any order with additional or fewer operation than those included in the above description without departing from the spirit or scope of the present description.

Figure 4A:
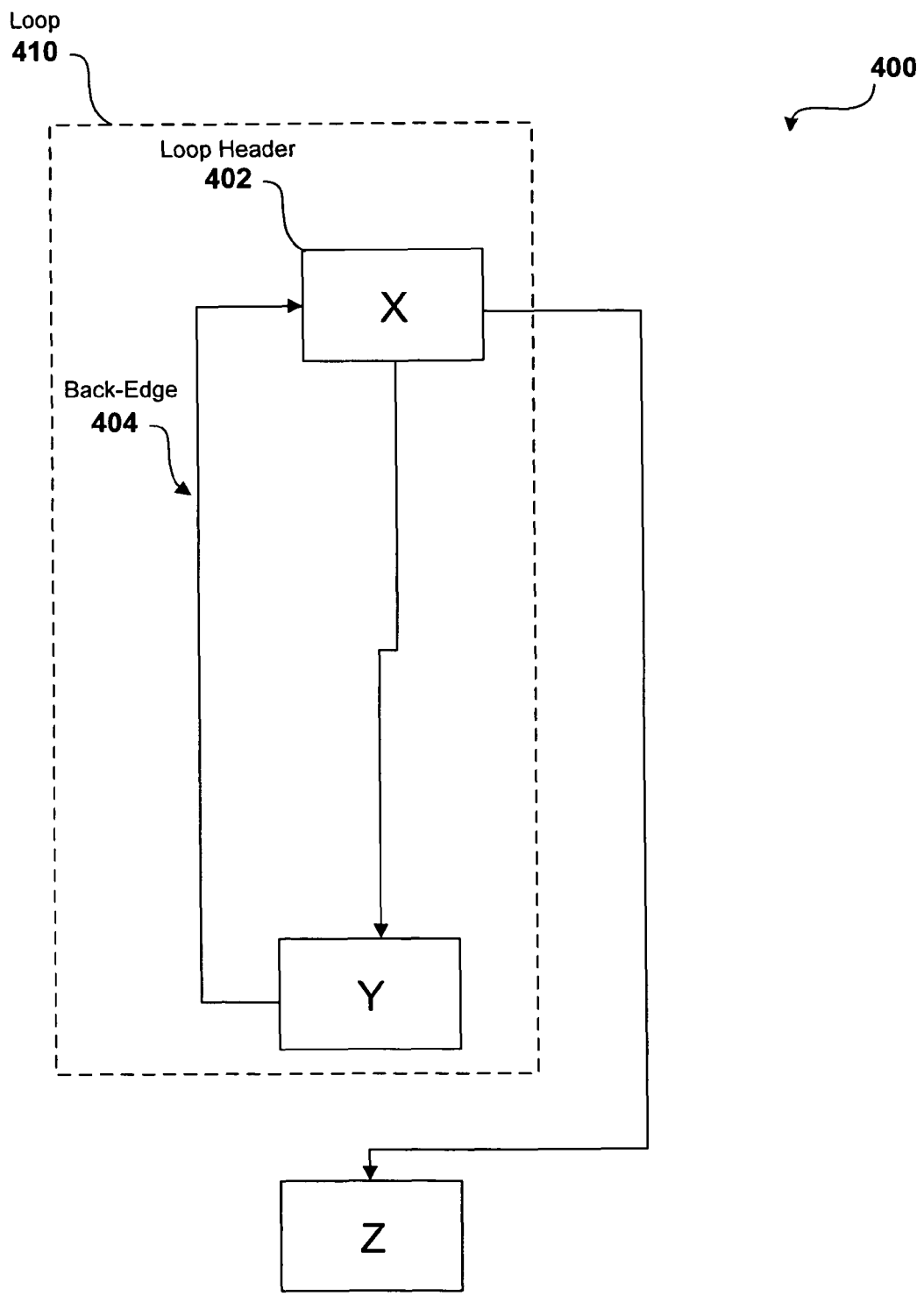
FIG. 4A illustrates an exemplary control-flow graph for a typical program that includes a loop.

FIG. 4A corresponds to a control-flow graph for that includes a loop in accordance with the present disclosure. Control-flow graph 400 includes loop 410. Loop 410 includes a loop header 402 and a back-edge 404. Back-edge 402 is a back edge because the program block at the tail of the back edge (X) (target of the edge) dominates its head (Y) (source of the edge). One node dominates another node when all paths in the latter pass through the former. Loop header 402 is the loop header for loop 410 because loop header 402 is the target of back-edge 404.

Although control-flow graph 400 shows a single loop, multiple loops may be present. Additionally, although control-flow graph 400 shows the loop as being between two program blocks (X,Y), a program block may include one or more loops within the block.

FIGS. 4B, 5, and 6 illustrate another abstract program with its accompanying control-flow graph, block equations, and dominator tree for arranging the verification condition to hide irrelevant facts from the theorem prover, in accordance with the present description.

FIG. 4B corresponds to the control-flow graph for the abstract program used in generating the verification condition. Control-flow graph 420 includes various code or program blocks (e.g., 425). Each program block (e.g., 425) corresponds to a section of the program that controls the program operation during the flow of execution for the program. In one embodiment, control-flow graph 420 corresponds to an acyclic control-flow graph, having no loops in the flow of execution for the program. In another embodiment, control-flow graph 420 corresponds to a passive, acyclic control-flow graph, having no loops in the flow of execution for the program and also comprising assume statements in place of assign statements. From control-flow graph 420 a verification condition may be generated for validating the program against its specification.

FIG. 5 illustrates exemplary block equations used to provide a verification condition and the arrangement of the verification condition to hide irrelevant facts, in accordance with the present disclosure. Verification condition 500 illustrates an initial form of the verification condition corresponding to control-flow graph 420 of FIG. 4B. Initial verification condition 500 is comprised of the block equations (e.g., 502) corresponding to each program block (e.g., 425) of control-flow graph 420.

However, forwarding verification condition 500 to the theorem prover may result in the theorem prover walking through the entire program before providing a validation output. Accordingly, no matter where the error occurs in relation to the block equations (e.g., 502) of verification condition 500, the theorem prover still explores the other blocks of the program and facts presented by those block before returning a validation output.

As described herein, final verification condition 510 is instead forwarded to the theorem prover (e.g., 270 of FIG. 2). The structure of verification condition 510 is such that areas of the program corresponding to the verification condition are not reached when an error is discovered in other areas of the program. For example, if an error is discovered in the body of program block A, then the body of the other program blocks need not be checked by the theorem prover to be able provide a validation output (e.g., not valid). The structure of verification condition 510 is determined from the dominator relationship among the program blocks.

Turning to FIG. 6, illustrated is an exemplary dominator tree corresponding to the control-flow graph of FIG. 4B, in accordance with aspects of the present invention. Dominator tree 600 illustrates that a node (e.g., 610) is provided in the tree for each program block of control-flow graph 400. For example, dominator tree 600 illustrates that block A of control-flow graph 400 is the dominator for blocks B and F. Similarly, block B is the dominator of blocks C, D, and E.

Turning back to FIG. 5, it is noted that section 514, that includes the block equations for blocks B and F, is preceded by a verification of the block equation corresponding to block A based on the dominator relationship between block A and blocks B and F. Similarly, section 516 includes the block equations for blocks C, D, and E which are preceded by the verification of the block equation for block B according to the dominator relationship between block B and blocks C, D, and E.

In one embodiment, the structure of verification condition 510 ensures that the theorem prover attempts to validate program block A first, followed by validation of program blocks B and F. If blocks A, B, and F are valid then program blocks C, D, and E are validated. If a block that is untested is irrelevant to any potential errors found in previously validated program blocks, then that untested program block may be ignored by the theorem prover. Certain theorem provers may validate the program blocks in a random order, or according to other internal algorithms. The structure of verification condition 510 provides a control of the order in which the blocks are validated prior to the representation of the program being provided to the theorem prover.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-readable storage having computer-executable instructions for verifying a program, comprising:
   converting a programming language of the program into an intermediate language;
   eliminating loops within the program represented by the intermediate language such that the program corresponds to an acyclic intermediate language representation of the program;
   converting the program from the acyclic intermediate language representation into a passive, acyclic intermediate language representation comprising a plurality of program blocks each corresponding to a specific section of the program;
   determining dominators for the passive, acyclic intermediate language representation of the program, wherein the passive command module converts the intermediate language representation of the program to a passive intermediate language program by replacing assignment statements in the intermediate language representation with assume statements; and
   generating a verification condition from the passive, acyclic intermediate language representation of the program, the verification condition comprising a plurality of hierarchically structured block equations each assigned to one of the plurality of program blocks, wherein each block equation comprises a first term associated with an assigned program block and a term associated with each dominating program block according to the determined dominators, wherein the plurality of hierarchically structured block equations of the verification condition causes a theorem prover to:
   randomly evaluate a first level of the hierarchically structured block equations prior to evaluating a subordinate level of hierarchical structured block equations,
   evaluate the subordinate level of hierarchical structured block equations when the first level of hierarchically structured block equations is valid; and
   ignore the subordinate level of hierarchically structured block equations when the first level of hierarchically structure block equations is not valid.

2. The computer-readable storage of claim 1, wherein the intermediate language allows representation of the program as a control-flow graph.

3. The computer-readable storage of claim 1, wherein eliminating loops in the program represented by intermediate language produces a program represented by an acyclic control-flow graph.

4. The computer-readable storage of claim 1, wherein converting the program to the passive, acyclic intermediate language representation produces a program represented by a passive, acyclic control-flow graph.

5. The computer-readable storage of claim 4, wherein determining dominators for the passive, acyclic intermediate language representation of the program further comprises determining the dominators by evaluating a dominator tree generated in association with the passive, acyclic control-flow graph.

6. A computer-implemented method for validating a program, comprising:
   translating a program to correspond to an intermediate language representation, wherein the intermediate language is expressed as a control-flow graph comprising a plurality of program blocks each corresponding to a specific section of the program; and
   generating a verification condition corresponding to the control-flow graph, the verification condition comprising a plurality of hierarchically structured block equations each assigned to one of the plurality of program blocks, wherein each block equation comprises a first term associated with an assigned program block and a term associated with each of a plurality of dominating program blocks,
   wherein the hierarchically structured block equations of the verification condition causes a theorem prover to:
   evaluate a first level of the hierarchically structured block equations prior to evaluating a subordinate level of hierarchical structured block equations,
   evaluate the subordinate level of hierarchical structured block equations when the first level of hierarchically structured block equations is valid; and
   ignore the subordinate level of hierarchically structured block equations when the first level of hierarchically structure block equations is not valid.

7. The computer-implemented method of claim 6, further comprising eliminating loops of the program prior to generating the verification condition, wherein elimination of the loops corresponds to removing back edges from the control-flow graph of the program.

8. The computer-implemented method of claim 7, further comprising converting the intermediate language representation of the program to include passive commands such that the passive command module converts the intermediate language representation of the program to a passive intermediate language program by replacing assignment statements in the intermediate language representation with assume statements.

9. The computer-implemented method of claim 6, wherein hierarchically structuring the verification condition further comprises structuring the verification condition according to a dominator relationship between the program blocks of the control-flow graph.

10. The computer-implemented method of claim 6, further comprising forwarding the verification condition to a theorem prover once the verification condition is produced.

11. A program verification system, comprising:
  a processor implementing instructions encoded on a non-transitory medium thereon to verify a program;
  a specification, wherein the program is validated against the specification;
  an intermediate language translator that is executed by a processor to translate the program from its language to an intermediate language expressible by a control-flow graph;
  a loop eliminator that is executed by a processor to eliminate the loops within the intermediate language representation of the program;
  a passive command module that is executed by a processor to convert the intermediate language representation of the program to a passive intermediate language representation, wherein the passive command module converts the intermediate language representation of the program to a passive intermediate language program by replacing assignment statements in the intermediate language representation with assume statements;
  a dominator determination module that is executed by a processor to determine the dominator relationship between program blocks of the control-flow graph;
  a verification condition generator that is executed by a processor to create a verification condition according to the dominator relationship and the passive intermediate language representation of the program, wherein the verification condition includes a plurality of hierarchically structured block equations each assigned to one of the plurality of program blocks, wherein each block equation comprises a first term associated with an assigned program block and a term associated with each dominating program block according to the determined dominator relationship; and
  a theorem prover, wherein the theorem prover:
  receives the verification condition,
  evaluates a first level of the hierarchically structured block equations prior to evaluating a subordinate level of hierarchical structured block equations,
  evaluates the subordinate level of hierarchical structured block equations when the first level of hierarchically structured block equations is valid; and
  ignore the subordinate level of hierarchically structured block equations when the first level of hierarchically structure block equations is not valid.

12. The program validation system of claim 11, wherein the loop eliminator eliminates loops in the intermediate language representation of the program by identifying and removing back-edges in the control-flow graph.

13. The program validation system of claim 12, wherein removing the back-edges in the control-flow graph generates an acyclic control-flow graph for generating an acyclic intermediate language representation of the program.

* * * * *